Inventor:
Cornelius A. Lucey,
by
His Attorneys.

2,726,885

SPLIT PACKING GLAND

Cornelius A. Lucey, Schodack, N. Y., assignor to Sterling Drug Inc., New York, N. Y., a corporation of Delaware Application April 1, 1953, Serial No. 346,061

3 Claims. (Cl. 286—33)

My invention relates to stuffing boxes and particularly to improvements in glands for use therewith. More particularly, it relates to a gland of the type which may be readily assembled about the shaft of a pump or the like without the necessity of slipping it over the end of said shaft.

The principal object of my invention is to provide a gland, including a follower and flanges, or yokes, co-operating with said follower for securing it in place around a shaft, and also regulating the compression which the follower exerts on the packing. A further object of my invention is to provide a gland of this type which is extremely simple in construction and consists essentially of only four parts in which the follower consists of two, identical half portions and the yokes or flanges are identical so that they may be cast in the same mold.

I accomplish these objects by means of the novel combination of elements described below and illustrated in the accompanying drawing in which—

Referring to the drawing—

Figure 4:
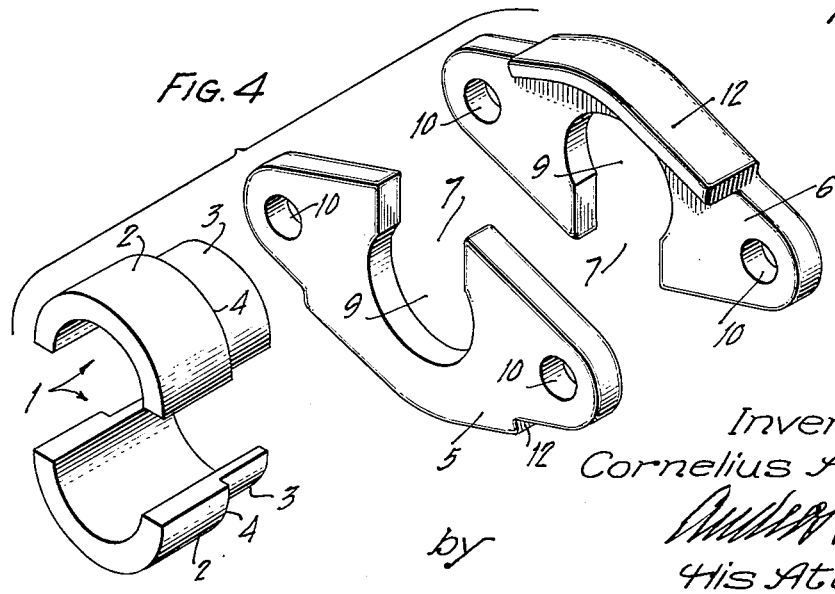
Fig. 4 is an exploded perspective view of the gland.

My device comprises a follower 1, usually made of bronze, comprising two, identical half portions, which are best shown in Fig. 4, whereby they may be readily assembled about a shaft, and which have a uniform inside diameter adapted closely to engage said shaft and two, axially-spaced portions 2 and 3 of different outside diameter and having a shoulder 4 therebetween.

Figure 1:
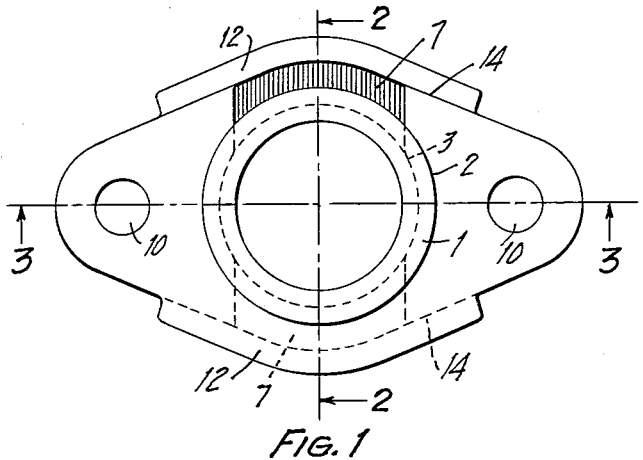
Fig. 1 is a view of my gland as seen from the inner side thereof.
Figure 2:
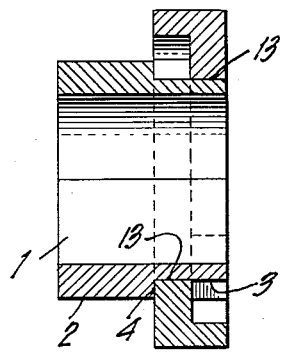
Fig. 2 is a section of Fig. 1 in the plane 2—2.
Figure 3:
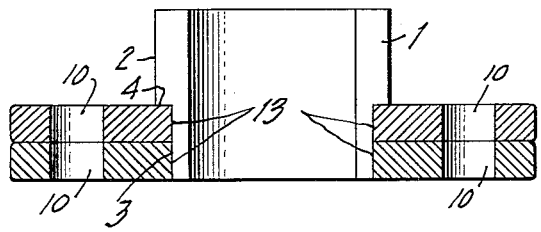
Fig. 3 is a section of Fig. 1 in the plane 3—3.
Figure 5:
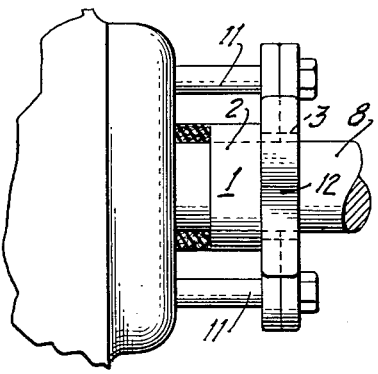
Fig. 5 is a side elevation view partially in section showing a portion of a pump or the like, with its shaft and the gland in place thereon.

In order to hold the follower in place around the shaft, I provide two, identical yokes 5 and 6 each having a centrally disposed arcuate passage 9 therethrough of a diameter adapted closely to engage that portion of said follower of smaller outside diameter when inserted therein, as shown at 13 in Figs. 2 and 3, and, preferably, throughout a circumferential extent in excess of 180°. Each yoke is provided with a passage 7 extending from an edge thereof into the passage 9 and of a width adapted to pass the shaft 8 to which the gland is to be applied. At each side of the passage 9, the yokes are provided with holes 10 for the passage of studs 11, or the like, for securing the gland in place.

While they are not absolutely necessary for use in connection with my gland, I prefer to provide each of the yokes with a marginal rib 12 which is adapted to co-operate with the edge of the other yoke and overlie the opening therein, as shown at 14, when the said yokes are laid one over the other. Thus, these ribs serve to reinforce or strengthen the yokes and the assembly thereof where it otherwise might be weak and flex, due to the passages through the flanges, when it is secured in place.

From the foregoing, it will be apparent that the follower 1 may be first assembled around the shaft 8. The flanges or yokes may then be assembled around said shafts and the portion 3 of the follower having the lesser outside diameter may be pushed into the openings 9. The whole gland as then assembled may be secured around the shaft 8 and the pressure of the follower upon the packing adjusted by means of the studs 11.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A packing gland comprising a follower having an inside diameter adapted closely to engage a shaft and having two portions of different outside diameter with an annular shoulder therebetween; said follower comprising separate half portions whereby it may be readily assembled around said shaft; and two, substantially identical yokes, separate from said follower, each having a centrally disposed arcuate passage therethrough of a diameter adapted closely to engage that portion of said follower of smaller outside diameter when inserted therein, and having a passage extending from an edge of said yoke into said central passage of a width less than the diameter of said central passage but adapted to pass said shaft; said yokes being provided at each side of said central passage with holes adapted to receive threaded studs for securing said gland in place.

2. In a packing gland, the combination with a follower comprising separate half portions having an inside diameter adapted closely to engage a shaft and two portions of different outside diameter separated by an annular shoulder; of two, substantially identical yokes, separate from said follower, each having a centrally disposed arcuate passage therethrough of a diameter adapted closely to engage that portion of said follower of smaller outside diameter when inserted therein, and having a passage extending from an edge of said yoke into said central passage of a width less than the diameter of said central passage but adapted to pass said shaft; said yokes being provided at each side of said central passage with holes adapted to receive threaded studs for securing said gland in place; each of said yokes being provided on the edge opposite the passage extending into said central passage with means adapted, when said yokes are assembled by laying one over the other, to overlie the entrance to the passage in the other yoke which extends into the central passage thereof, and also to strengthen said yokes and the assembly thereof against stresses tending to flex the same when said gland is secured in place.

3. In a packing gland, a follower having an inside diameter adapted closely to engage a shaft and comprising two, similar, half portions, whereby, it may be readily assembled about a shaft, and having two portions of different outside diameter with an annular shoulder therebetween; two, substantially identical yokes, separate from said follower, each having a centrally disposed arcuate passage therethrough of a diameter and circumferential extent adapted closely to engage throughout an arc in excess of 180° that portion of said follower of smaller outside diameter when inserted therein, and having a passage extending from an edge of said yoke into said arcuate passage of a width less than the diameter of said arcuate passage but adapted to pass said shaft; said yokes being provided at each side of said arcuate passage with holes adapted to receive studs for securing said gland in place; and each of said yokes being provided on the edge thereof opposite the passage extending into said central passage with a rib integral therewith adapted, when said yokes are assembled by laying one over the other, to overlie the entrance to the passage in the other yoke which extends into the central passage thereof, and also to strengthen said yokes and the assembly thereof against stresses tending to flex the same when said gland is secured in place.

References Cited in the file of this patent

UNITED STATES PATENTS

| | | |
|---|---|---|
| 362,367 | Denton | May 3, 1887 |
| 990,841 | Collins | May 2, 1911 |
| 1,256,780 | Enger | Feb. 19, 1918 |
| 1,482,716 | Sudekum | Feb. 5, 1924 |